W. HODGDON.
MILK-COOLER.
No. 175,094. Patented March 21, 1876.
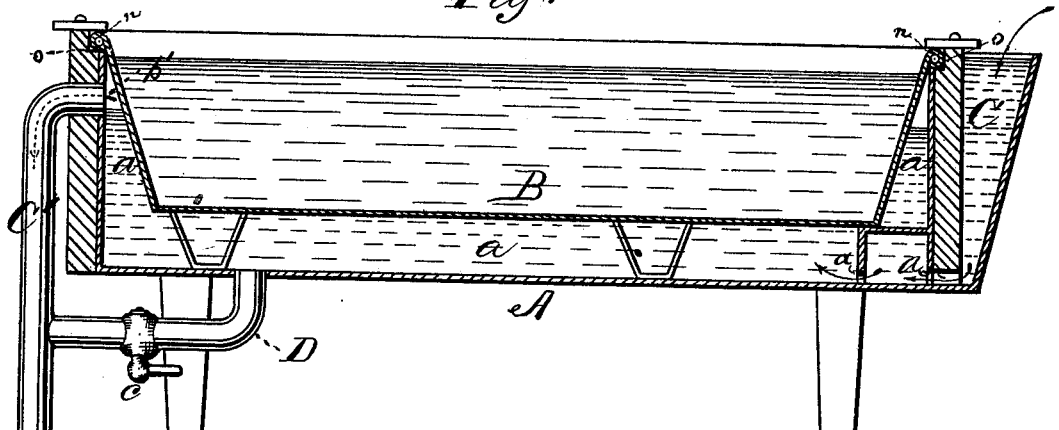
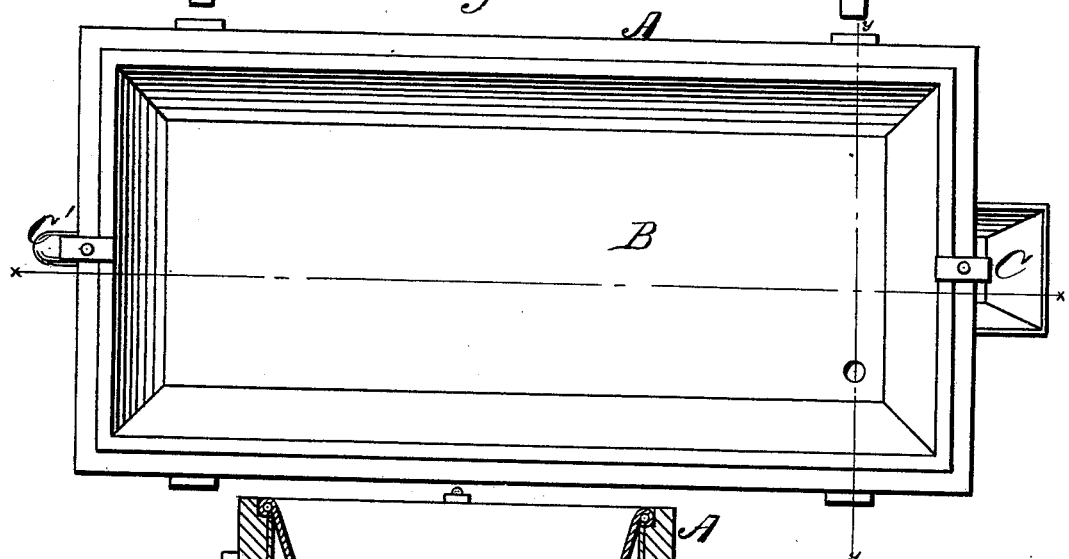
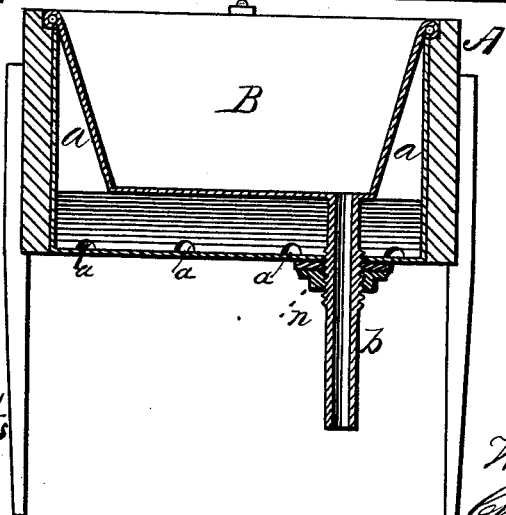
WITNESSES
E. H. Bates
F. J. Masi
INVENTOR
William Hodgdon,
Chipman & Hosmer
ATTORNEYS
N. PETERS, PHOTO-LITHOGRAPHER, WASHINGTON, D.C.

UNITED STATES PATENT OFFICE.

WILLIAM HODGDON, OF NORTH TROY, VERMONT.

IMPROVEMENT IN MILK-COOLERS.

Specification forming part of Letters Patent No. 175,094, dated March 21, 1876; application filed December 4, 1875.

*To all whom it may concern:*

Be it known that I, WILLIAM HODGDON, of North Troy, in the county of Orleans and State of Vermont, have invented a new and valuable Improvement in Milk Pans and Coolers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical central section of my milk cooler, and Fig. 2 is a plan view of the same. Fig. 3 is a transverse vertical sectional view of the same.

This invention has relation to improvements in milk-coolers, wherein the pan containing the milk is surrounded on all sides by a current of flowing water, contained in an outer vessel in which the said pan is placed, and it consists in means, substantially as hereinafter described, whereby the underflow and overflow of the said outer vessel may be discharged through a single eduction-pipe into one vessel or receptacle, as will be hereinafter more fully set forth.

In the annexed drawings, the letter A designates a rectangular wooden or metal trough of suitable depth and dimensions, within which is placed a metallic pan, B, designed to receive milk. This pan tapers inwardly as to its sides and ends so as to form a space, $a$, between it and the interior vertical faces of trough A, into which a stream of water will be directed through the medium of a chute, C, arranged at one end and communicating with the said trough by means of openings $a$ $a$. Pan B is provided at one or both ends with an eduction-pipe, $b$, extending through the bottom of trough A, through which the contents of pan B will be allowed to flow, when a stopper is removed from the said pipe or a suitable stop-cock is opened, all leakage being prevented from trough A by means of a nut, $n$, which is screwed upon the projecting end of pipe $b$ up against the bottom of trough A, as shown in Fig. 3. The other end of trough A is provided with an aperture, $b'$, at a suitable distance above the bottom of the said trough, into the outer end of which is fitted a metallic overflow-pipe, C', through which the water will flow out of the trough, upon reaching a certain level, into a suitable receptacle or conduit, thereby preventing the cooling fluid from overflowing the edges of milk-pan B and mingling with the milk. A pan of milk being sufficiently cooled and ready to be skimmed, that is, to be deprived of its cream, the supply of water is cut off from chute. Under these circumstances the water in trough A will remain on a level with aperture $b'$. This water will be discharged through a metallic tube, D, one end of which is inserted in an aperture in the bottom of trough A, and the other end jointed to and connected with discharge-pipe C', so that when a stop cock, $c$, is opened all the water may be let out of trough A, when not required for use, and both the overflow through pipe C' and the underflow through pipe D may be discharged into one and the same receptacle or conduit.

What I claim as new, and desire to secure by Letters Patent, is—

In a milk-cooler, the vessel A, provided with a chute, C, openings $a$, recess $o$, overflow-pipe C' and connected waste-water pipe D, having cock $c$, in combination with the milk-pan B, provided with legs, and having the discharge-pipe $b$ and flange $n$, substantially as described and for the purpose set forth.

In testimony that I claim the above I have hereunto subscribed my name in the presence of two witnesses.

WILLIAM HODGDON.

Witnesses:
N. D. MARTIN,
E. G. DARLING.